(12) United States Patent
Hackney et al.

(10) Patent No.: US 6,501,554 B1
(45) Date of Patent: Dec. 31, 2002

(54) 3D SCANNER AND METHOD FOR MEASURING HEIGHTS AND ANGLES OF MANUFACTURED PARTS

(75) Inventors: Joshua J. Hackney, Wayzata, MN (US); John Ma, Burnsville, MN (US); Arye Malek, Edina, MN (US); Matthew M. McPherson, Minneapolis, MN (US); Xin Shi, Mound, MN (US)

(73) Assignee: PPT Vision, Inc., Eden Prairie, MN (US)

( * ) Notice: Subject to any disclaimer, the term of this patent is extended or adjusted under 35 U.S.C. 154(b) by 372 days.

(21) Appl. No.: 09/597,865

(22) Filed: Jun. 20, 2000

(51) Int. Cl.[7] ............................................. G01B 11/24
(52) U.S. Cl. ........................................ 356/601; 356/625
(58) Field of Search ................................ 356/601, 614, 356/625, 627, 628, 630, 634, 635, 327.1, 327.2, 327.3

(56) References Cited

U.S. PATENT DOCUMENTS

| | | | |
|---|---|---|---|
| 3,069,654 A | 12/1962 | Hough | 340/146.3 |
| 4,212,073 A | 7/1980 | Balasubramanian | 364/562 |
| 4,370,300 A | 1/1983 | Mori et al. | 422/108 |
| 4,494,874 A | 1/1985 | DiMatteo et al. | 356/376 |
| 4,639,139 A | 1/1987 | Wyant | 356/359 |
| 4,641,972 A | 2/1987 | Halioua et al. | 356/376 |

(List continued on next page.)

FOREIGN PATENT DOCUMENTS

| | | | |
|---|---|---|---|
| EP | 0638801 | 2/1995 | G01N/21/88 |
| WO | 98/02716 | 1/1998 | G01B/11/03 |

OTHER PUBLICATIONS

Ballard, D.H., "Generalizing the Hough Transform to Detect Arbitrary Shapes", *Pattern Recognition*, 13(2), Pergamon Press, pp. 183–194, (1981).

(List continued on next page.)

*Primary Examiner*—Hung Xuan Dang
(74) *Attorney, Agent, or Firm*—Schwegman, Lundberg, Woessner & Kluth, P.A.

(57) ABSTRACT

In the context of a machine-vision system for inspecting a part, a method and apparatus to provide high-speed 3D (three-dimensional) inspection of manufactured parts. Parts are inspected to obtain dimensional and geometric information regarding such characteristics as sag or bow of subportions of the item, the angle of pitch, yaw, and or roll of one portion relative to another, heights of various formations on the part. In some embodiments, an array of height pixels is calculated, and regions of interest (ROIs) are located within the array, and the ROIs are used to determine characteristic geometries of the parts being measured. One measurement system includes a light source, an imager, and a computer. Light source provides projected patterned light on the object useful to obtain 3D geometric information about the object. The imager has a reception optical axis that intersects the object when the machine-vision system is in operation. In some embodiments, imager includes at least three rows of imaging pixels positioned to receive light shone onto the object by the light source. The computer system calculates three-dimensional object-geometry data of the object using signals from the imager, and computes at least a first characteristic plane and a second characteristic plane of the object from the calculated object-geometry data. The method provides a process for obtaining and manipulating image data (e.g., make calculations on ROI data within one or more arrays of height pixels) to determine characteristics of the parts.

27 Claims, 9 Drawing Sheets

U.S. PATENT DOCUMENTS

| | | | |
|---|---|---|---|
| 4,705,395 A | 11/1987 | Hageniers | 356/1 |
| 4,965,665 A | 10/1990 | Amir | 358/101 |
| 4,967,066 A | 10/1990 | Beraldin et al. | 250/205 |
| 4,967,284 A | 10/1990 | Yoshida et al. | 358/300 |
| 4,991,968 A | 2/1991 | Yonescu et al. | 356/376 |
| 5,060,065 A | 10/1991 | Wasserman | 358/106 |
| 5,085,502 A | 2/1992 | Womack et al. | 356/376 |
| 5,251,156 A | 10/1993 | Heier et al. | 364/559 |
| 5,355,221 A | 10/1994 | Cohen et al. | 356/359 |
| 5,379,107 A | 1/1995 | Hanssen et al. | 356/376 |
| 5,398,113 A | 3/1995 | de Groot | 356/360 |
| 5,426,302 A | 6/1995 | Marchman et al. | 250/306 |
| 5,465,152 A | 11/1995 | Bilodeau et al. | 356/371 |
| 5,546,189 A | 8/1996 | Svetkoff et al. | 356/376 |
| 5,561,525 A | 10/1996 | Toyonaga et al. | 356/360 |
| 5,621,218 A | 4/1997 | Tanaka | 250/559.34 |
| 5,636,025 A | 6/1997 | Bieman et al. | 356/374 |
| 5,646,733 A | 7/1997 | Bieman | 356/376 |
| 5,680,215 A | 10/1997 | Huber et al. | 356/371 |
| 5,719,952 A | 2/1998 | Rooks | 382/150 |
| 5,745,176 A | 4/1998 | Lebens | 348/370 |
| 5,753,903 A | 5/1998 | Mahaney | 250/205 |
| 5,859,698 A | 1/1999 | Chau et al. | 356/237 |
| 5,943,125 A | 8/1999 | King et al. | 356/237.1 |
| 6,011,620 A | 1/2000 | Sites et al. | 356/239.1 |
| RE36,560 E | 2/2000 | Svetkoff et al. | 356/376 |
| 6,022,124 A | 2/2000 | Bourn et al. | 362/247 |
| 6,025,905 A | 2/2000 | Sussman | 356/3.01 |
| 6,069,701 A | 5/2000 | Hashimoto et al. | 356/376 |
| 6,072,898 A | 6/2000 | Beaty et al. | 382/146 |
| 6,173,070 B1 | 1/2001 | Michael et al. | 382/145 |
| 6,181,472 B1 | 1/2001 | Liu | 359/618 |
| 6,222,187 B1 | 4/2001 | Shivanandan | 250/330 |
| 6,249,347 B1 | 6/2001 | Svetkoff et al. | 356/376 |
| 6,260,000 B1 | 7/2001 | Karasaki et al. | 702/155 |
| 6,282,462 B1 | 8/2001 | Hopkins | 700/259 |
| 6,341,016 B1 * | 1/2002 | Malione | 356/601 |

OTHER PUBLICATIONS

Davies, E.R., Machine Vision: Theory, Algorithms, Practicalities, 2nd Edition, Academic Press, San Diego, pp. 195–210, (1997).

Yang, H.S., et al., "Determination of the identity, position and orientation of the topmost object in a pile: some further experiments", *IEEE International Conference on Robotics and Automation*, 1, San Francisco. CA, 293–298, (1986).

* cited by examiner

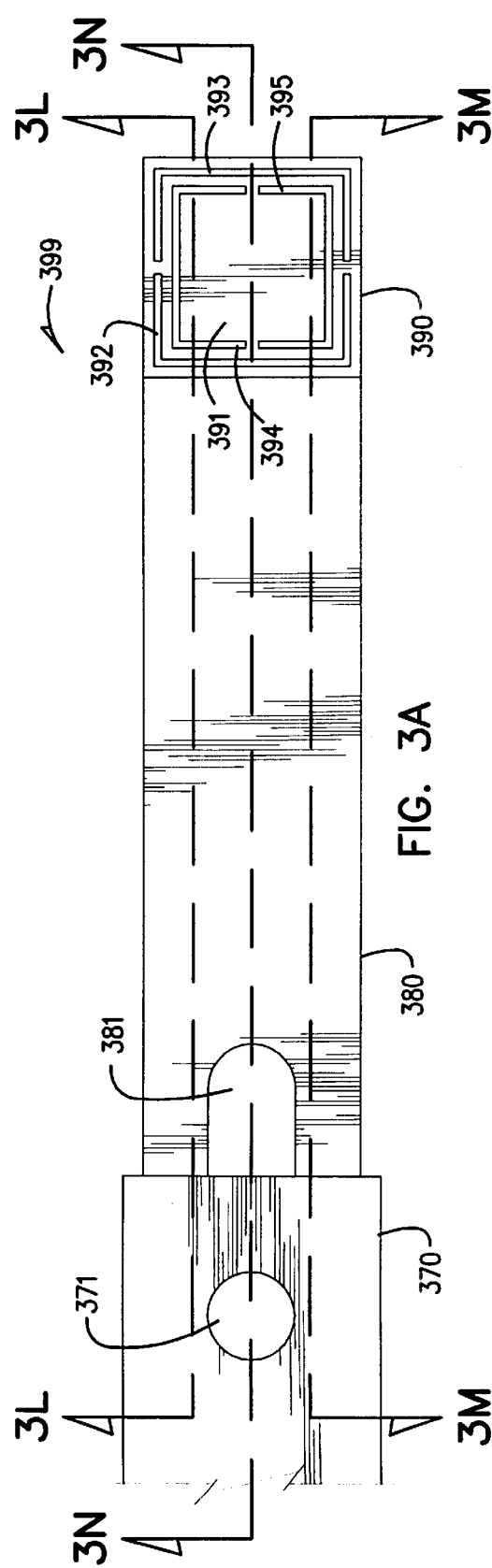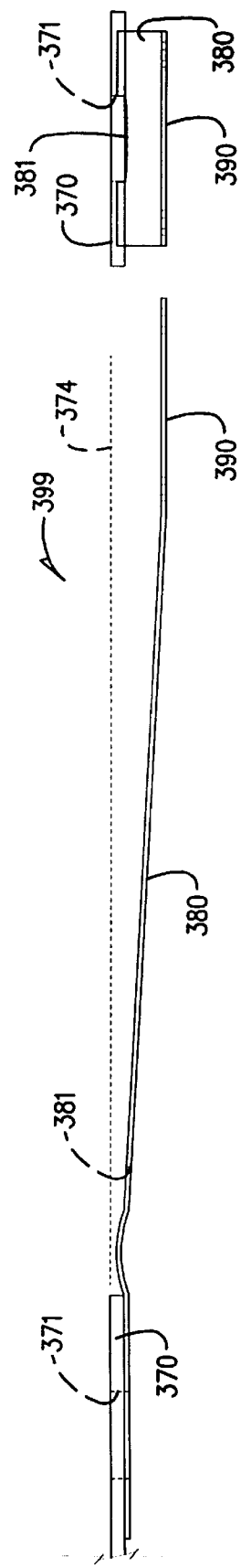

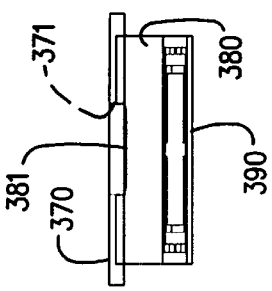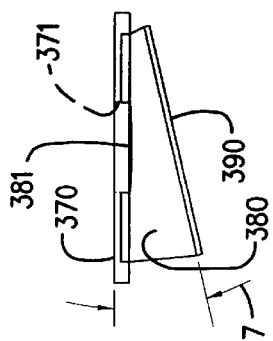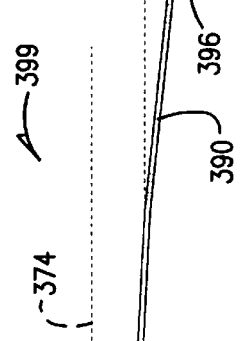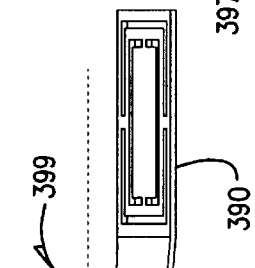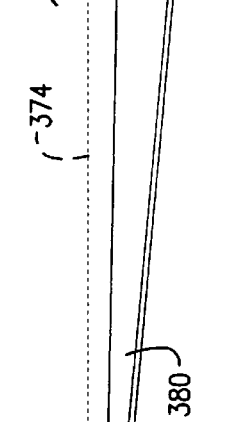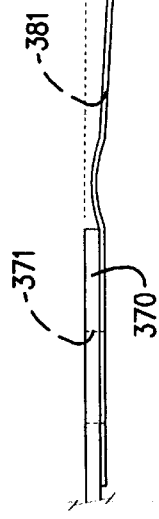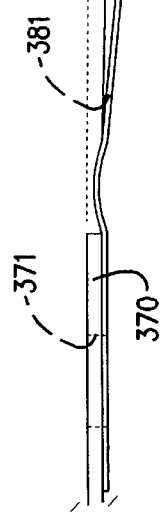

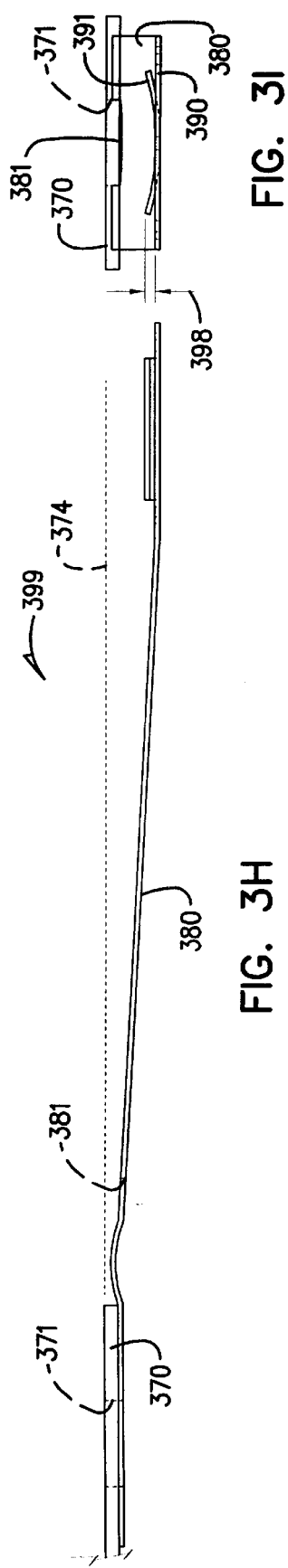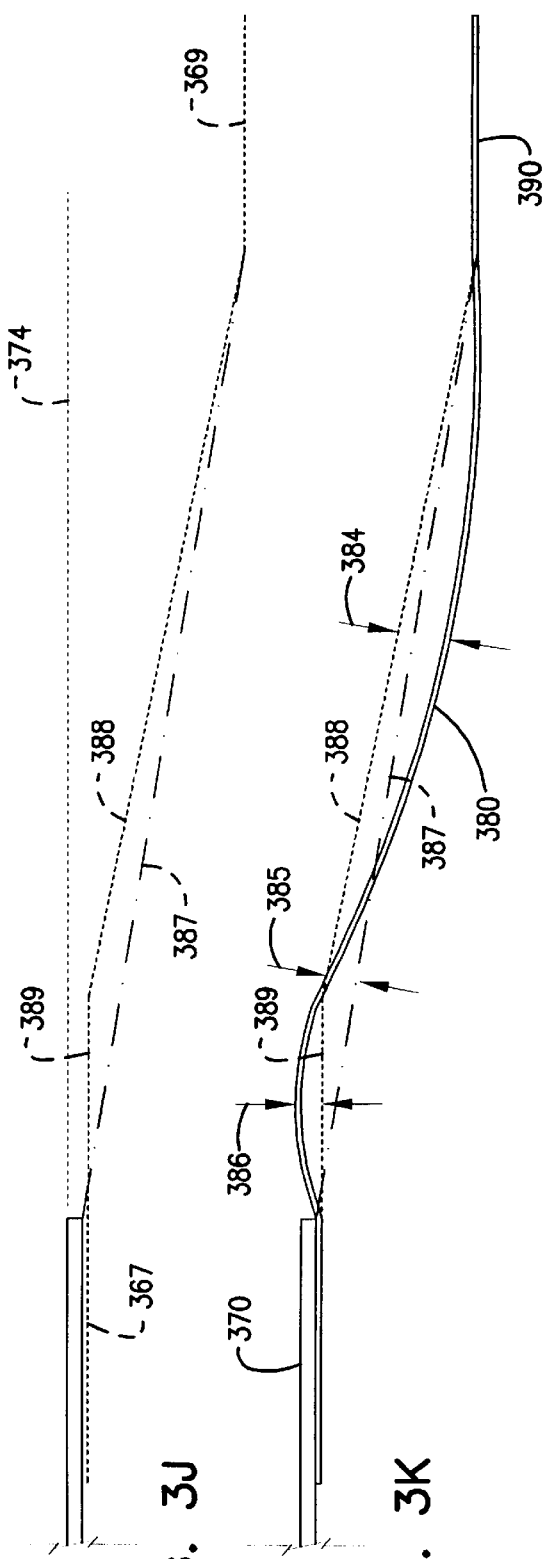

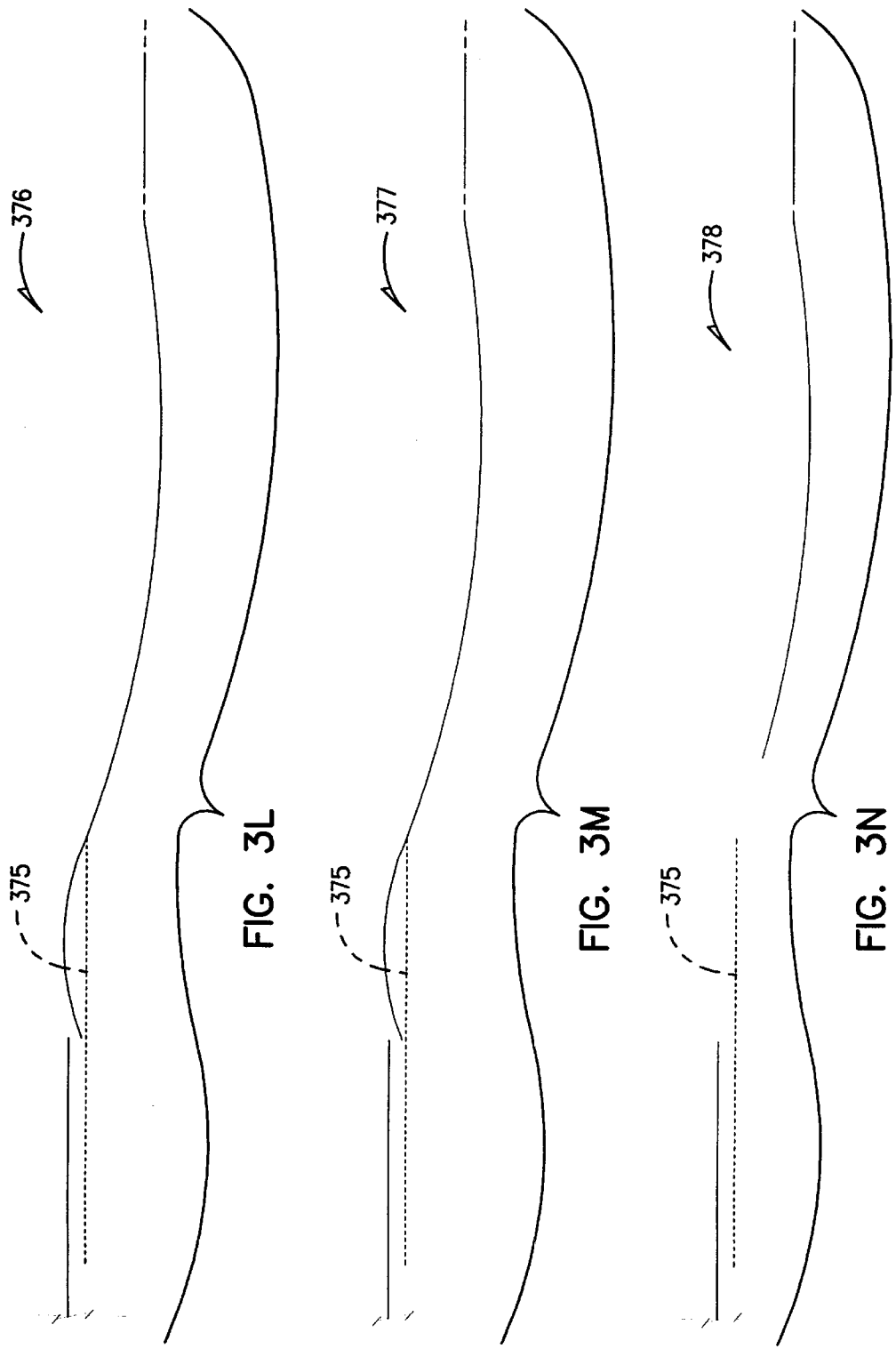

3D SCANNER AND METHOD FOR MEASURING HEIGHTS AND ANGLES OF MANUFACTURED PARTS

RELATED APPLICATIONS

This invention is related to:

U.S. patent application Ser. No. 09/350,051, entitled "CIRCUIT FOR MACHINE-VISION SYSTEM" filed Jul. 8, 1999, U.S. patent application Ser. No. 09/350,050, entitled "MACHINE-VISION SYSTEM AND METHOD FOR RANDOMLY LOCATED PARTS" filed Jul. 8, 1999, U.S. patent application Ser. No. 09/350,255, entitled "PARTS MANIPULATION AND INSPECTION SYSTEM AND METHOD" filed Jul. 8, 1999, U.S. patent application Ser. No. 09/349,684, entitled "MACHINE-VISION SYSTEMS AND METHODS WITH UP AND DOWN LIGHTS" filed Jul. 8, 1999, U.S. patent application Ser. No. 09/349,948, entitled "METHOD AND APPARATUS TO CALCULATE BGA BALL TOPS" filed Jul. 8, 1999, U.S. patent application Ser. No. 09/350,049, entitled "COMBINED 3D- AND 2D-SCANNING MACHINE-VISION SYSTEM AND METHOD" filed Jul. 8, 1999, U.S. patent application Ser. No. 09/350,037, entitled "MACHINE-VISION SYSTEM AND METHOD HAVING A SINE-WAVE PROJECTION PATTERN" filed Jul. 8, 1999, U.S. patent application Ser. No. 09/350,251, entitled "TRAY FLIPPER AND METHOD FOR PARTS INSPECTION" filed Jul. 8, 1999, U.S. patent application Ser. No. 09/598,069, entitled "BINARY OPTICAL GRATING AND METHOD FOR GENERATING A MOIRE PATTERN FOR 3D IMAGING" filed on even date herewith, and U.S. patent application Ser. No. 09/597,795 entitled "PRECISION 3D SCANNER BASE AND METHOD FOR MEASURING MANUFACTURED PARTS" filed on even date herewith, which are all assigned to a common assignee, and which are incorporated herein by reference.

FIELD OF THE INVENTION

This invention relates to the field of machine vision, and more specifically to a method and apparatus of obtaining three-dimensional inspection data for manufactured parts (such as disk-drive suspension assemblies) in a manufacturing environment.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998–2000, PPT Vision, Inc., All Rights Reserved.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998–1999, PPT Vision, Inc., All Rights Reserved.

BACKGROUND OF THE INVENTION

There is a widespread need for inspection data for electronic parts in a manufacturing environment. One common inspection method uses a video camera to acquire two-dimensional images of a device-under-test.

Height distribution of a surface can be obtained by projecting a light-stripe pattern onto the surface and then re-imaging the light pattern that appears on the surface.

One technique for extracting this information based on taking multiple images (three or more) of the light pattern that appears on the surface while shifting the position (phase) of the projected light stripe pattern is referred to as phase shifting interferometry, as disclosed in U.S. Pat. Nos. 4,641,972 and 4,212,073 (incorporated herein by reference).

The multiple images are usually taken using a CCD (charge-coupled device) video camera with the images being digitized and transferred to a computer where phase-shift analysis, based on images being used as "buckets," converts the information to a contour map (i.e., a three-dimensional representation) of the surface.

The techniques used to obtain the multiple images are based on methods that keep the camera and viewed surface stationary with respect to each other while moving the projected pattern.

One technique for capturing just one bucket image using a line scan camera is described in U.S. Pat. No. 4,965,665 (incorporated herein by reference).

U.S. Pat. Nos. 5,398,113 and 5,355,221 (incorporated herein by reference) disclose white-light interferometry systems which profile surfaces of objects.

In U.S. Pat. No. 5,636,025 (incorporated herein by reference), an optical measuring system is disclosed which includes a light source, gratings, lenses, and camera. A mechanical translation device moves one of the gratings in a plane parallel to a reference surface to effect a phase shift of a projected image of the grating on the contoured surface to be measured. A second mechanical translation device moves one of the lenses to effect a change in the contour interval. A first phase of the points on the contoured surface is taken, via a four-bucket algorithm, at a first contour interval. A second phase of the points is taken at a second contour interval. A control system, including a computer, determines a coarse measurement using the difference between the first and second phases. The control system further determines a fine measurement using either the first or second phase. The displacement or distance, relative to the reference plane, of each point is determined, via the control system, using the fine and coarse measurements.

Current vision inspection systems have many problems. Among the problems are assorted problems associated with the mechanical translation devices used with the vision inspection systems to handle the devices under inspection. One problem is that vision systems typically take up a large amount of linear space on a manufacturing line. Typically small devices, such as disk-drive suspensions, are placed in standard trays, to facilitate the handling of the small devices.

In other cases, the disk-drive suspensions are manufactured from a continuous strip of thin metal, wherein at least a portion of the strip is maintained, with other portions cut away to form the suspensions, thus leaving the suspensions attached to the remaining strip. The suspensions can bend at various angles relative to the strip they are attached to. This strip is then used to facilitate the handling of the suspensions, such as positioning the suspensions under a machine-vision head at an inspection station. The exact positioning of the suspensions in their trays, or their relative orientation to the strip can vary, putting demands on the machine-vision system to determine the orientation and angle of the parts relative to the machine-vision head.

To overcome the problems stated above as well as other problems, there is a need for an improved machine-vision system and more specifically for a mechanical apparatus and method for inspecting manufactured parts such as disk-drive suspensions, and for determining various heights, dimensions, and angles of the parts.

SUMMARY OF THE INVENTION

In the context of a machine-vision system for inspecting a part, this invention includes method and apparatus to provide high-speed 3D (three-dimensional) inspection of manufactured parts. In some embodiments, precision stamped, formed, and/or laser-cut metal parts are inspected to obtain dimensional and geometric information regarding such characteristics as sag or bow of subportions of the item, the angle of pitch, yaw, and/or roll of one portion relative to another, heights of various formations on the part.

One aspect of the present invention provides a machine-vision system for inspecting an object. This system includes a light source, an imager, and a computer. The light source provides projected patterned light on the object useful to obtain 3D geometric information about the object. The imager has a reception optical axis that intersects the object when the machine-vision system is in operation. In some embodiments, the imager includes at least three rows of imaging pixels positioned to receive light shone onto the object by the light source. Computer system calculates three-dimensional object-geometry data of the object using signals from the imager, and computes at least a first characteristic plane and a second characteristic plane of the object from the calculated object-geometry data.

In some embodiments, the machine-vision system further includes an inspection station that supports the object, a scanner mechanism, an isolation mount, and a machine base The scanner mechanism moves the imager relative to the object at the inspection station such that different portions of the object are successively imaged by the imager The machine base supports the inspection station and the scanner mechanism. The isolation mount is located between the machine base 410 and the inspection station to reduce coupling of vibration between the machine base and the inspection station. In some embodiments, the scanner mechanism 408 and the inspection station are affixed to one another more rigidly than either is to the machine base. In some embodiments, the isolation mount also provides vibration dampening.

Another aspect of the present invention provides a method of measuring a three-dimensional geometry of an object having at least one surface to be measured. The method includes receiving image signals representing a three-dimensional geometry of the object into a computer, calculating with the computer object-geometry data representing three-dimensional geometry of the object, and calculating with the computer values representing at least a first characteristic plane and a second characteristic plane of the object from the calculated object-geometry data.

Yet another aspect of the present invention provides a machine-vision system for inspecting an object that includes a light source that provides projected light on the object and an imager, wherein the imager generates signals from the light representative of three-dimensional object-geometry data of the object. In some embodiments, the system includes means for determining at least a first characteristic plane and a second characteristic plane of the object from the image signals. In other embodiments, system includes means for determining an angle between a first characteristic plane and a second characteristic plane of the object from the image signals. In other embodiments, system includes means for determining a distance between a first feature of the object and a first characteristic plane and the distance between a second feature of the object a second characteristic plane of the object from the image signals.

BRIEF DESCRIPTION OF THE DRAWINGS

FIG. 3A shows a top view of a part 399 to be measured by the present invention.

FIG. 3B shows a side view of a part 399 to be measured by the present invention.

FIG. 3C shows an end view of a part 399 to be measured by the present invention.

FIG. 3D shows a side view of a part 399 having a pitch angle 396.

FIG. 3E shows an end view of a part 399 having a pitch angle 396.

FIG. 3F shows a side view of a part 399 having a roll angle 397.

FIG. 3G shows an end view of a part 399 having a roll angle 397.

FIG. 3H shows a side view of a part 399 having a cupping 398.

FIG. 3I shows an end view of a part 399 having a cupping 398.

FIG. 3J shows a side view of a part 399 showing three reference planes.

FIG. 3K shows an end view of a part 399 having bump height 386, offset 385 and sag 384.

FIG. 3L shows a graph of a right-side bump height profile.

FIG. 3M shows a graph of a left-side bump height profile.

FIG. 3N shows a graph of a centerline height profile.

DETAILED DESCRIPTION OF THE PREFERRED EMBODIMENT

Figure 1A:
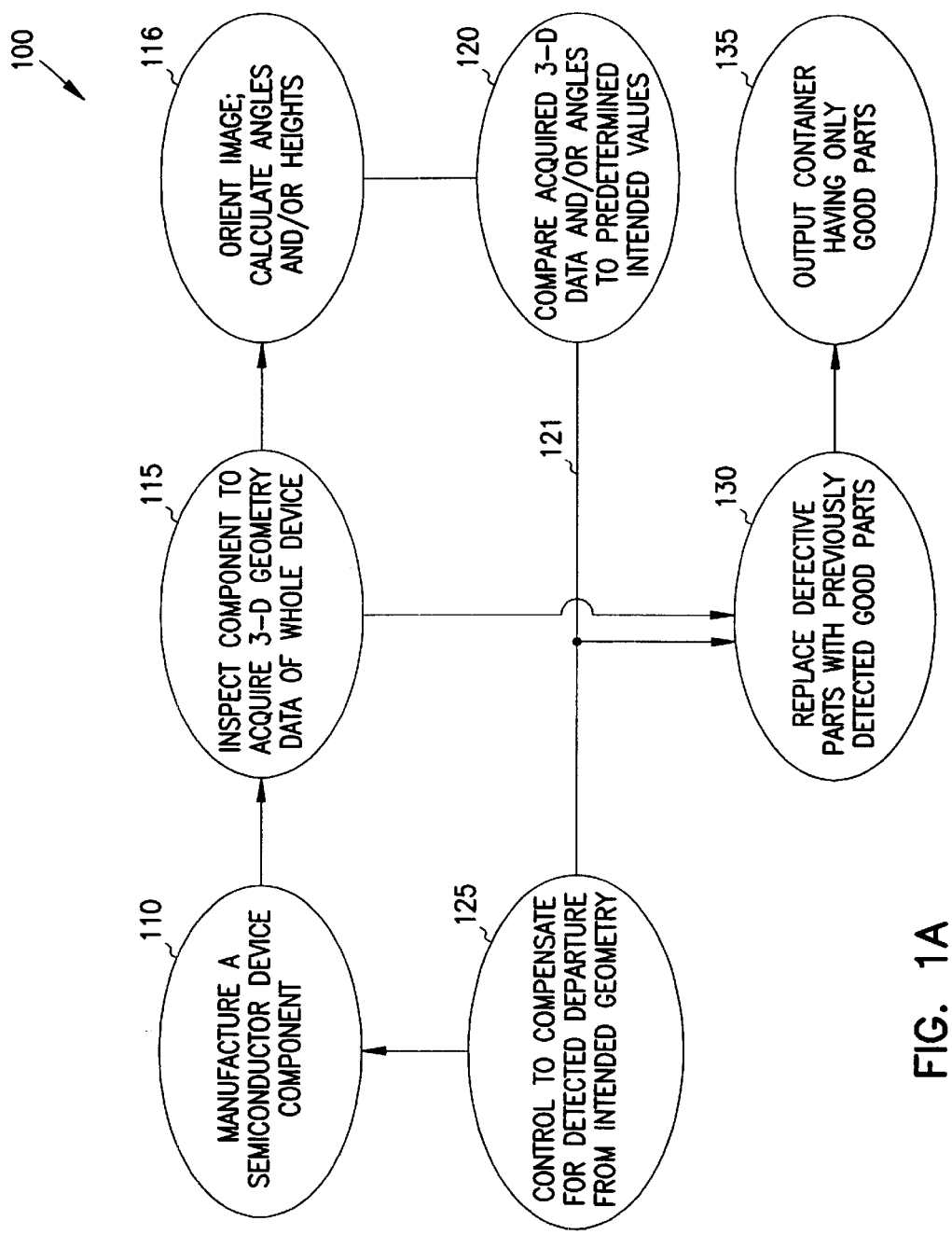
FIG. 1A shows an embodiment of the present invention, a method 100 for the manufacture and inspection of devices.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Machine-vision and optical-feature-recognition techniques can be used to distinguish parts that deviate from a predetermined intended aspect of an ideal device. In this description, a "device" is meant to be any device of manufacture or object, for example an integrated circuit package, electronic part, semiconductor, molded plastic part, aluminum wheel, gemstone or even an egg or strawberry, which can be inspected. Typically, according to the present invention, a manufacturing operation will use two-dimensional and three-dimensional information, along with measured angles of respective portions of the parts acquired from inspection of the device to distinguish "good" parts from "bad" parts, and can discard the bad parts and insert previously inspected good parts in their place. In some embodiments, the devices under test are placed into pocketed trays or into cartons for ease of handling and transport, and inspection will take place of the devices while the devices are in the pocketed trays, according to the present invention.

U.S. Pat. No. 5,646,733 to Bieman (incorporated herein by reference) describes a method and system that include an optical head which is moved relative to an object at a machine-vision station. A projected pattern of light (e.g., a pattern of stripes or lines) is scanned across the surface of an object to be inspected to generate an imagable light signal to acquire three-dimensional information associated with the object. The optical head includes at least one pattern projector which projects a pattern of lines and an imaging subsystem that includes a trilinear-array camera as a detector. The camera and the at least one pattern projector are maintained in fixed relation to each other. The trilinear-array camera includes three linear detector elements, each having, for example, about 1,000 to 4,000 pixels, which extend in a direction parallel with the pattern of lines. The geometry of the optical head is arranged in such a way that each linear detector element picks up a different phase in the line pattern. As the optical head is scanned across the surface of interest, the detector elements are continuously read out. Depth at each point on the surface is calculated from the intensity readings obtained from each of the detector elements that correspond to the same point on the surface. In this way, the phases of the pattern are calculated from the three intensity readings obtained for each point.

As described herein, the term "light" is meant to encompass any electromagnetic radiation including visible, infrared, and/or ultraviolet wavelengths, whether or not it is polarized, monochromatic, coherent, or modulated. Some embodiments use monochromatic light, while other embodiments use light having a range of wavelengths. Some embodiments use coherent light such as from a laser source. Some embodiments use polarized light, while others do not. Some embodiments used light whose intensity varies with time (such as pulsed light illumination to freeze motion), while other embodiments use DC light.

System Overview

Figure 1B:
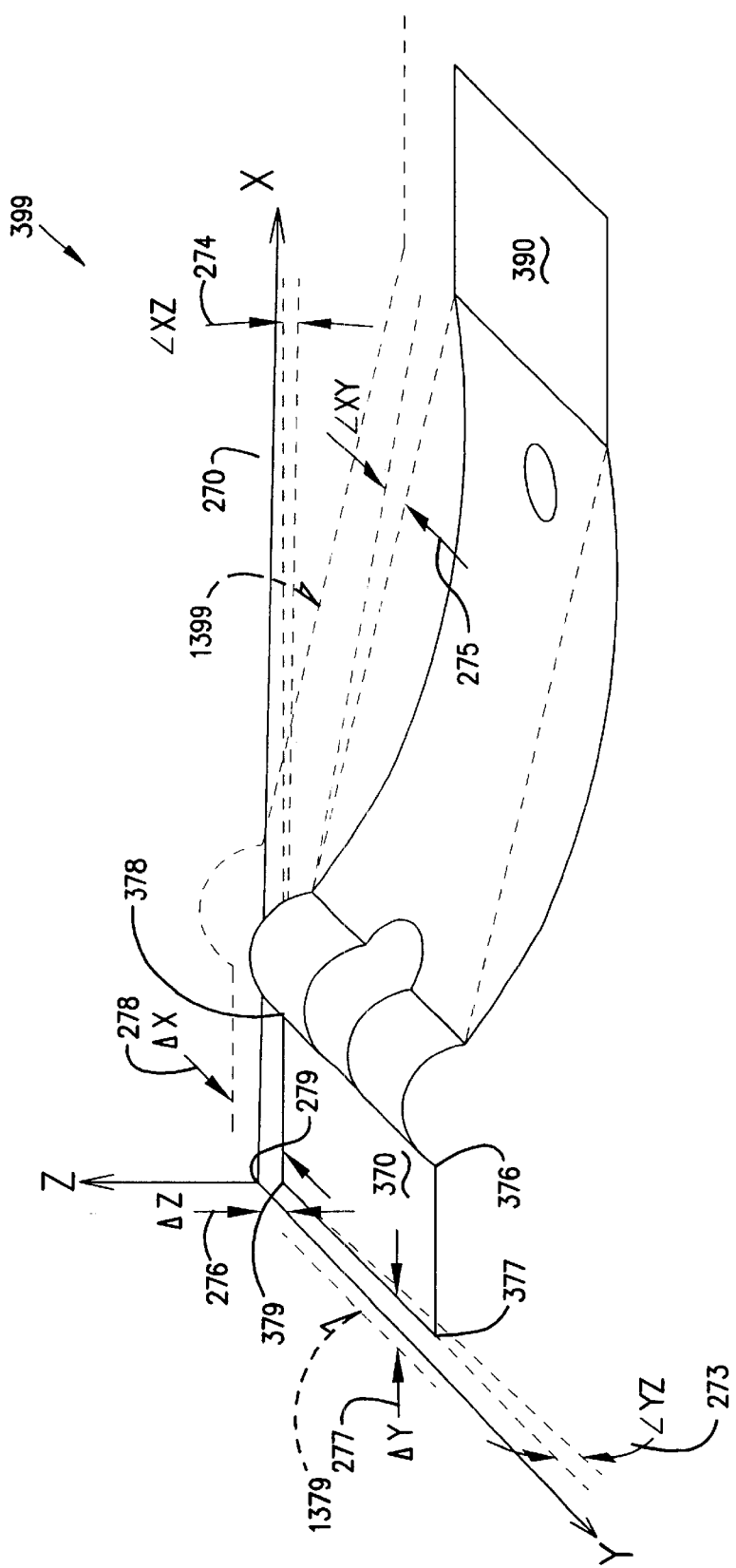
FIG. 1B shows a typical manufactured part having various features to be measured.

FIG. 1A is a schematic representation of a high-speed automated inspection system 100 and its associated method, according to one embodiment of the present invention. FIG. 1B shows a typical manufactured part 399 having various features to be measured. At station 110, a manufacturing process or step produces or modifies a device 399. The device 399 can be a part or assembly of parts, for example, a leaded header for holding an integrated circuit, or a slider assembly for a disk drive. In one embodiment, the device 399, along with a plurality of other devices are placed in a pocketed tray. In another embodiment, each device is held in a slot or clamp of an inspection holder. In yet another embodiment, each device is attached to, or part of, a continuous strip of metal out of which each device is cut and formed. In still other embodiments, devices to be inspected are attached to continuous plastic strips that are, e.g., unwound from a reel in order to be inspected, inspected in line as the devices move across the camera, and then rewound onto a reel after inspection. In other embodiments, other containers or holders for device 399 are used are used. In yet other embodiments, devices are moved on a conveyor-belt-type line under the scanning camera, with no tray, strip, or other container. Thus, wherever the inspection of devices in trays is discussed herein, it is to be understood that other variations or alternative embodiments are contemplated that inspect devices using other containers, or devices attached to strips, or even devices without any container.

Referring to FIG. 1B, manufactured part 399 having various features to be measured is shown. Part 399 here represents a disk-drive suspension, but could be any other part, assembly, or product having features to be measured. In some applications, it is important to know whether two planar portions of the part 399 are parallel, for example whether the surface of base 370 is parallel to platform 390. This helps determine whether the part will perform adequately when the base 370 is attached to a disk actuator arm and a disk head is attached to platform 390 and the head expected to be parallel to the disk surface in a disk drive. In other applications, a predetermined angle is desired between the two planar surface portions. In some embodiments, system 100 determines whether such planar surfaces are parallel or at some other desired angle or orientation to one another.

Referring again to FIG. 1A, At station 115, the tray of devices is scanned to acquire two-dimensional (2D) and/or three-dimensional (3D) data representing the geometry of every device on the tray or holder. In one embodiment, a CCD camera having digital output is used in station 115. In one such embodiment, the digital output of the CCD represents a 2D image of device 399. In another embodiment, a 3D scanning Moire interferometry (SMI) sensor 401 (a measurement head such as described in U.S. patent application Ser. No. 09/350,050, entitled "MACHINE-VISION SYSTEM AND METHOD FOR RANDOMLY LOCATED PARTS") is used to acquire 3D dimensions (i.e., the X, Y, and Z dimensions of various features of device 399), and/or intensity measurements (i.e., the brightness, color, or reflectivity of various features of device 399). Some embodiments acquire both 2D and 3D information, using either two separate sensors, or using a common sensor that acquires both types of measurements.

Function 116 (used in some embodiments) orients the measurement data to a standard orientation and calculates one or more angles of the part. For example, the part 399, as measured, may not be perfectly aligned relative the optical measurement head 401, and thus the part as a whole could have an X offset and Y offset due to being located to one side of the tray pocket, a Z offset due to variations in pocket depths of the tray, and could also have pitch, roll, and/or yaw angles. Thus function 116 examines the image acquired at station 115, locates two or more reference features of the part 399, and then mathematically "moves" the image of the part to remove the X, Y, and/or Z offset. In some embodiments, the feature recognition function finds corner 379 of base 370, and then subtracts its X coordinate 278, Y coordinate 277, and Z coordinate 276 from every other point of the image, thus "moving" the image of part 399 so corner 379 of the part 399 is at the origin 279 of the machine-vision coordinate system. The feature recognition system than locates another feature of base 370, for example corner 378, and performs a linear transformation to remove yaw angle 275. Further, in some embodiments, function 116 also determines a plane of a reference portion (herein base 370 is used as this reference portion) of the part 399, and mathematically "rotates" the entire image of part 399 so that the plane of base 370 of part 399 aligns to a standard reference plane (removing the pitch and roll angles of the plane of base 370). In some embodiments, the above described linear transformations are merged, combined or performed in other orders, in order to achieve substantially the same result, for example, using feature recognition to locate the X, Y, and Z coordinates of points 377, 378, and 379 of base 370, and then translating and linear-transforming to remove the offset(s) and align the plane of base 370 to the reference plane 270. In other embodiments, no such linear transforms are performed, but instead the characteristic plane(s) are directly compared to one another or to a standard desired configuration.

Function 116 then determines the plane of another surface portion of part 399, for example, platform 390. Thus, when the 3D representation of part 399 is translated and rotated such that the first planar portion aligns to the coordinate system both in the orientation of the surface and the alignment of one or more corners or edges, then the relative position and/or angle of other portions of the part are readily checked. In some embodiments, the machine-vision software does pattern-recognition to determine the 3D location of various portions of the part, such as base 370, transition portion 380, and platform 390. Examples of geometric parameters to check within a single portion are the flatness of a planar portion (i.e., determining a characteristic plane of a portion that should be flat to within some tolerance, and the maximum deviation from that characteristic plane of points within the portion) and/or determining whether the "planar" portion is cup shaped, cylinder shaped, saddle shaped or twisted beyond some defined tolerance. Examples of geometric parameters to check between two portions are the relative angle between two planar portions, for example the relative angle in the XZ plane and the relative angle in the YZ plane of the two surfaces (relative tilt), and/or the relative angle in the XY plane of edges of the two surfaces (edge rotation).

The acquired relative angle data as well as 2D and/or 3D and/or intensity data is processed at station 120, and compared to data of a predetermined intended geometry. In one embodiment, this comparison distinguishes good devices from bad devices, and a signal 121 is output. In one embodiment, signal 121 is used at station 125 as a control to compensate for the detected departure from the intended geometry, thus providing feedback into the manufacturing step at station 10, in order to improve quality and yield of the manufacturing system. In another embodiment, signal 121 is used at station 130 to control the replacement of defective or substandard parts with good parts from a previously inspected tray of parts. At station 135, trays or containers of all-good parts are output from the system.

In one such exemplary system, at station 110, semiconductor parts (such as microprocessors) are manufactured, wherein the semiconductor parts have one major surface (the "connector side") that has a pattern of solder-ball connectors (a ball-grid array, or BGA). It is desirable to have the balls each located at a predetermined X and Y coordinate, and each having a predetermined Z-dimension height (within a predetermined tolerance) such that the "tops" of the balls are coplanar to within a predetermined tolerance. It is also desirable to have the substrate that the balls are connected to also be planar. The major surface opposite the connector side (the "label side") is typically marked with an identification label. In one such embodiment, the devices 399 are inspected at inspection station 115 on their connector side, then the devices are flipped over (e.g., into another tray) and inspected on their label side. In this embodiment, the inspected trays of parts are then passed to the replacement station 130, and a pick-and-place mechanism (in one embodiment, a vacuum-actuated robotic arm) removes defective parts according to data from signal 121, and replaces them with good parts from a previously inspected, partially filled tray of good parts. Thus, trays having complete populations of all-good parts are output at station 135.

In another such exemplary system, at station 110, objects to be inspected (for example parts having pins and heat-sink tabs) are placed into pocketed trays. At station 115, the objects are inspected (e.g., for size, shape, and visible defects for example blotches or cracks). At station 116, the angle between the plane of the heat-sink tab and the plane of the pins is determined, and a comparison of the measured angle to a predetermined angle (within a predetermined tolerance) is made, generating signal 121 as a result of the comparison. Signal 121 is used to control the replacement of defective objects, and/or the sorting of objects into trays or containers according to size, shape, color, or other criteria. In some, but not all, embodiments, signal 121 also feeds block 125 to provide feedback into the manufacturing process. In yet other embodiments, the angle between facets of a gemstone or features of a semiconductor circuit or wafer are measured. Thus the present invention can be used both in manufacturing environments as well as in the sorting and packaging of non-manufactured objects such as gemstones which may be collected from nature or other non-manufactured source.

Figure 2:
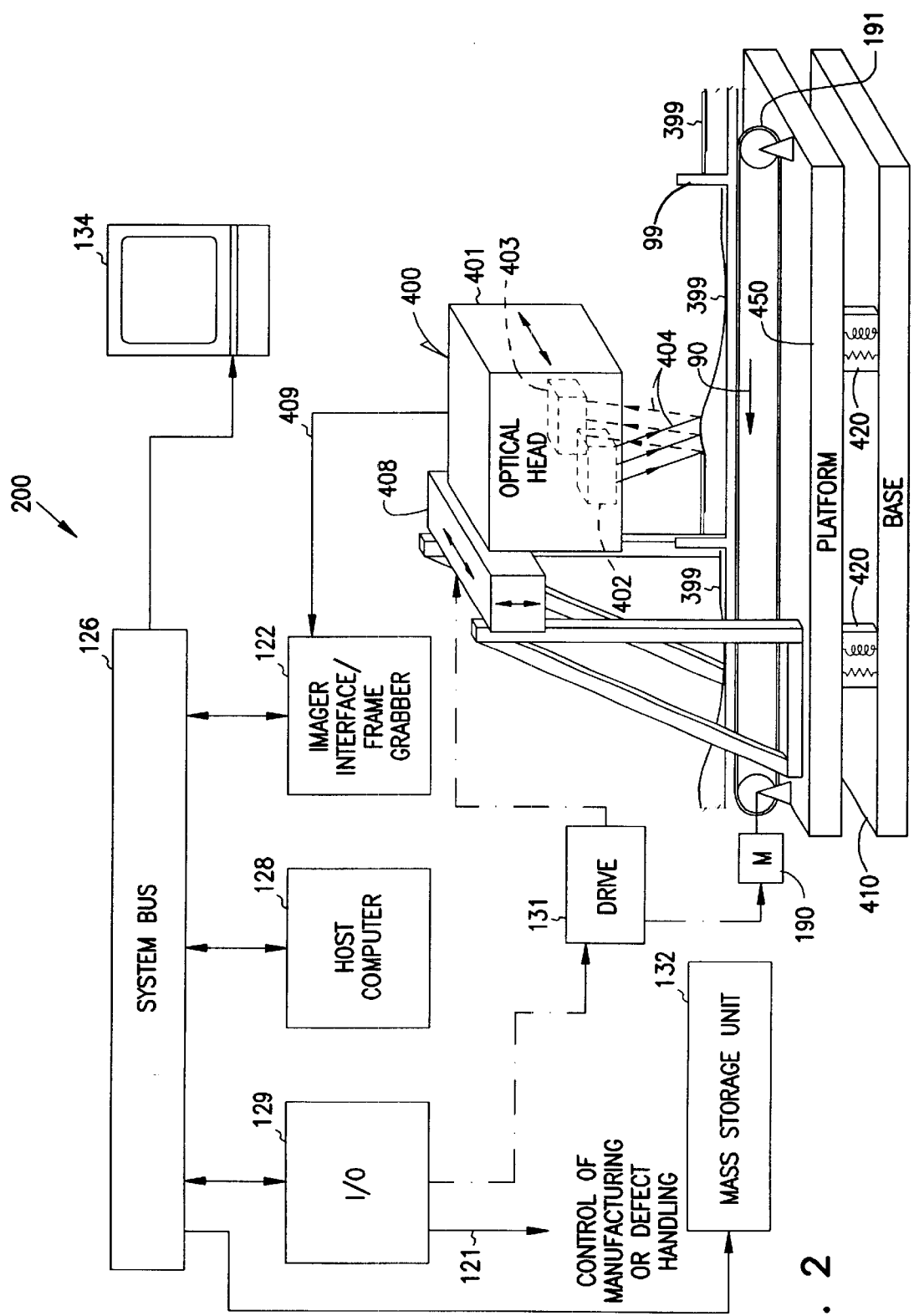
FIG. 2 shows an embodiment of the present invention, a computer-controlled system 200 for the control of the imaging operation and measurement functions of system 100.

FIG. 2 shows one exemplary embodiment of the present invention, a computer controlled system 200 for the control of the imaging operation and measurement functions of system 100. Host computer 128 is coupled through system bus 126 to mass storage unit 132 (e.g., a magnetic disk subsystem), input/output (I/O) subsystem 130, imager interface 122, and display 134. In one embodiment, imager interface 122 is coupled to an optical head 401 such as described in patent application Ser. No. 09/350,050, entitled "MACHINE-VISION SYSTEM AND METHOD FOR RANDOMLY LOCATED PARTS." In one embodiment, I/O subsystem 130 controls drive 131 which moves either optical head 401 or device 399 or both, in order to obtain a relative scanning motion between the two (one embodiment which scans a tray or clamp holding devices 399 keeps the tray stationary during the optical scanning operation, and moves only optical head 401, in order to eliminate movement of devices 99 within the tray due to vibration from the motors, and thereby obtain more accurate measurements). In one such embodiment, drive 131 moves head 401 to first scan one or more entire rows of devices 99 in a tray in a single pass in the Y direction, then increments the tray in the X direction, then performs a second scan of one or more entire rows of devices 99 in a single pass in the Y direction (parallel to but in the opposite direction to the first scan), and repeats this until the entire tray of parts is measured. This method/apparatus provides high accuracy by constraining camera movement to a single direction (i.e., plus and minus Y), thus allowing tighter positional controls since the head-motion gantry does not need to be moved in the X direction, and movement in the Z direction is only made to set the scan path to the proper depth position well before the scanning operation, and is left fixed after that.

Since each scan obtains data from a relatively wide scan stripe, there is no need to pre-align the parts (e.g., vibrate the tray to align the parts to one side of the tray pockets), or even necessarily to have tray pockets, although pockets are provided in one embodiment in order to facilitate other steps, such as pick-and-place operations to remove bad parts from trays and replace them with good parts. Imager interface 122 obtains raw scan data from optical head 401, and computes and stores processed data representative of the intensity and/or height of each X and Y coordinate of each device 99 (called "grabbing a frame"). Based on a comparison of the measured data to a predetermined set or range of acceptable or desired data, host computer 128 controls signal 121 through I/O subsystem 130. Signal 121 is used (in various embodiments) to control a step in the manufacturing process and/or to select a set of "all good" parts from among all parts produced.

FIG. 3A is a schematic top view of an exemplary manufactured part 399. FIG. 3B shows a side view of part 399, and FIG. 3C shows an end view of part 399. While the part is conventional, the comprehensive set of measurements made possible and performed by various embodiments of the present invention by the present invention are not. Part 399 is a thin metal part that includes a base 370, a transition section 380, and a head platform 390. In some embodiments, base 370 includes a plate 372 welded to the top of the thin suspension 373. Through hole 371 can be used to attach suspension 399 to an actuator arm. Plane 374 is a characteristic plane of the top surface of base 370. In some embodiments, the heights of a grid of points are measured to determine their heights, and a plane 374 is fit to those points by computer 128.

Figure 3O:
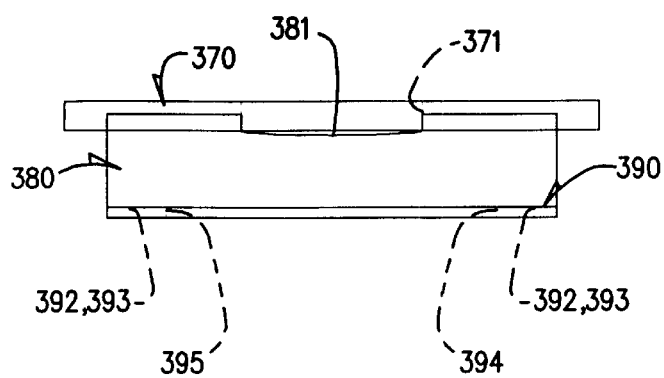
FIG. 3O shows a detailed enlarged end view of a part 399 having base 370 parallel to platform 390.

Transition section 380 includes a hole or slot 381, and on each side of slot 381, the part 399 is formed to create a curved raised bump 382. Typically, transition section 380 will be bent down relative to plane 374, in order to impart some spring force down to platform 390. Sometimes there will also be a "sag" in the middle of section 380 relative to a flat plane extending from the left end to the right end of section 380. In some embodiments, head platform 390 includes a center platform 391 surrounded by inner slits 394 and 395 (allowing platform 391 to rotate somewhat around a longitudinal axis, called "roll" rotation herein), and outer slits 392 and 393 (allowing platform 391 to rotate somewhat around a lateral axis perpendicular to the longitudinal axis, called "pitch" rotation herein). FIG. 3O shows a more detailed enlarged end view of the part 399 of FIG. 3C having base 370 parallel to platform 390. Other embodiments measure parts having other configurations and/or features such as different gimbles or bumps.

Figure 3P:
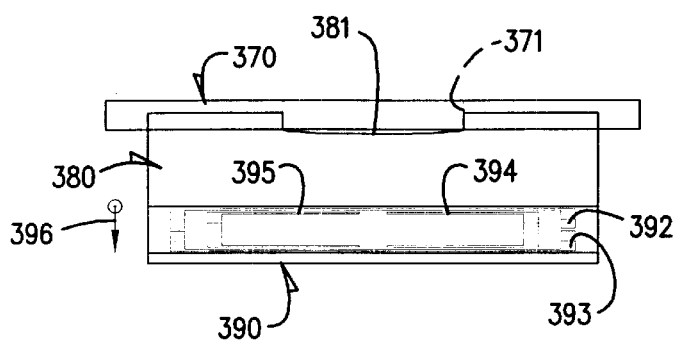
FIG. 3P shows a detailed enlarged end view of a part 399 having base 370 with a pitch angle 396 to platform 390.

FIG. 3D shows a side view, and FIG. 3E shows an end view, of a part 399 having a pitch angle 396. Pitch angle 396 is an angle (in the XZ plane of FIG. 1B) between the plane of the top surface of base 370 and the plane of center platform 391. In some applications, it is desirable to have pitch angle 396 to be zero, to within some allowable tolerance. In other applications, pitch angle 396 is desired to be set to some non-zero angle (either down or up). In some embodiments, the method 100 of FIG. 1A and the system 200 of FIG. 2 are used to measure angle 396, and accept or reject parts based on this measurement, and/or provide control feedback to adjust the manufacturing process that produces parts 399. FIG. 3P shows a detailed enlarged end view of the part 399 of FIG. 3E having base 370 with a pitch angle 396 to platform 390.

Figure 3Q:
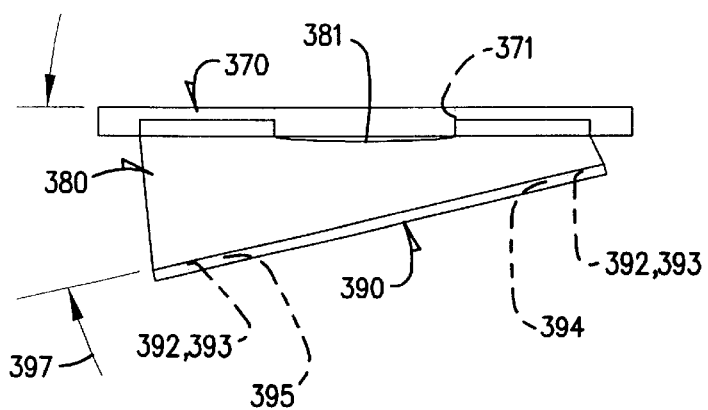
FIG. 3Q shows a detailed enlarged end view of a part 399 having base 370 with a roll angle 397 to platform 390.

FIG. 3F shows a side view, and FIG. 3G shows an end view, of a part 399 having a roll angle 397. Roll angle 397 is an angle (in the YZ plane of FIG. 1B) between the plane of the top surface of base 370 and the plane of center platform 391. In some applications, it is desirable to have roll angle 397 to be zero, to within some allowable tolerance. In other applications, roll angle 397 is desired to be set to some non-zero angle (either left or right). In some embodiments, the method 100 of FIG. 1A and the system 200 of FIG. 2 are used to measure angle 397, and accept or reject parts based on this measurement, and/or provide control feedback to adjust the manufacturing process that produces parts 399. FIG. 3Q shows a detailed enlarged end view of the part 399 of FIG. 3G having base 370 with a roll angle 397 to platform 390.

Figure 3R:
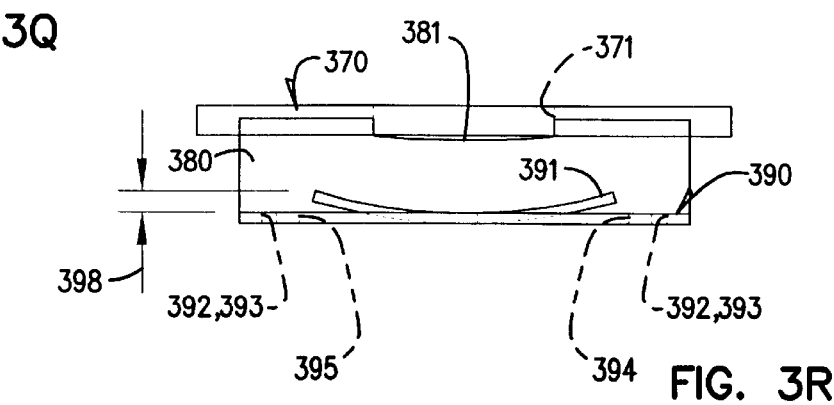
FIG. 3R shows a detailed enlarged end view of a part 399 having a cupping 398 in platform 390.

FIG. 3H shows a side view, and FIG. 3I shows an end view, of a part 399 having a cupping 398. Cupping 398 is a difference (relative to the XY plane of FIG. 1B) between a characteristic plane of the top surface of center platform 391 (for example, as defined by the edges of platform 390 inside slits 394 and 395), and some inside point (for example, the center point). In some applications, it is desirable to have cupping 398 to be zero, to within some allowable tolerance. In other applications, cupping 398 is desired to be set to some non-zero angle (perhaps to contain an adhesive used to attach a head). In some embodiments, the method 100 of FIG. 1A and the system 200 of FIG. 2 are used to measure cupping 398, and accept or reject parts based on this measurement, and/or provide control feedback to adjust the manufacturing process that produces parts 399. FIG. 3R shows a detailed enlarged end view of the part 399 of FIG. 3I having a cupping 398 in platform 390.

FIG. 3J shows a side view of a part 399 showing three reference planes, 387, 388, and 389. Reference plane 389 is the plane of the bottom surface 367 of the suspension under base 370. In some embodiments, the bottom surface 367 is imputed from plane 374 measured at the top surface of base 370, and from the assumed thickness of base 370. Reference plane 388 is the plane from the closest edge of bump 382 at the bottom surface of the suspension to the closest bottom edge of head platform 390. Reference plane 387 is the plane from the closest edge of base 370 at the bottom surface of the suspension under base 370 to the closest bottom edge of head platform 390.

FIG. 3K shows an end view of a part 399 having bump height 386, offset 385 and sag 384. Bump height 386 is defined as a measurement between the highest point of bump 382 relative to plane 389, and plane 389. Offset 385 is defined as a measurement between the front edge of bump 382 and plane 387. Sag 384 is defined as a measurement between the lowest point of portion 380 relative to plane 388, and plane 388. In some embodiments, in order to make the first of these three measurements, the characteristic plane 389 is determined, the part's 3D measurements are rotated using a linear transform, and translated to move the 3D image of the part to align plane 389 with the XY origin plane of FIG. 1B, and the highest point of the bump 382 is located (since plane 389 is aligned with the XY origin plane, this provides the relative height difference from plane 389 to the top of the bump), thus providing bump-height measurement 386. Then, in order to make the second of these three measurements, the characteristic plane 388 is determined, the part's 3D measurements are rotated using a linear transform, and translated to move the 3D image of the part to align plane 388 with the XY origin plane of FIG. 1B, and the "crease" of the front edge of bump 382 is located, thus providing offset measurement 385. In some embodiments, the crease is defined as the intersection of plane 389 with the far edge of the bump. Then, in order to make the third of these three measurements, the characteristic plane 388 (the plane extending from the crease of the front of the bump to the near edge of platform 390) is determined, the part's 3D measurements are rotated using a linear transform, and translated to move the 3D image of the part to align plane 387 with the XY origin plane of FIG. 1B, and the lowest point of the suspension portion 380 is located, thus providing sag measurement 384.

In other embodiments (i.e., for other types of parts), other characteristic planes are defined, and the relative offsets, bump heights, dimple depths, layer thicknesses (such as, e.g., of solder-paste or adhesives), section sags, pitch, roll, and/or yaw angles (or other twist angles) as desired, are measured and compared to predetermined ideal measurements to determine whether the parts are within the desired tolerances. In some embodiments, these measurements are used in further processing of the parts, in order to modify the parts to better comply with the desired characteristics for the parts.

In some embodiments, one or more linear cross-section profiles of the part 399 are measured. These profiles are measured along lines, for example, the straight parallel section lines 3L, 3M, and 3N of FIG. 3A (other embodiments use lines that are some geometric form other than straight parallel lines, such as orthogonal lines crossing the area of interest). FIG. 3L shows a graph of a right-side bump height profile 376 (see section line 3L of FIG. 3A). FIG. 3M shows a graph of a left-side bump height profile 377 (see section line 3M of FIG. 3A). FIG. 3N shows a graph of a center-line height profile 378 (see section line 3N of FIG. 3A). In some embodiments, these profiles are used to obtain bump-height measurement 386, offset measurement 385, and/or sag measurement 384.

In some embodiments, the bump height measurement is performed by averaging two or more points (height measurements) at or near the bump-height maximum, in order to reduce "noise" (irregularities in height measurements) that can otherwise give poor results. In one such embodiment, three or five points centered on the high point are averaged. In another such embodiment, a smooth curve is fit to such points to reduce noise, and the high point of such curve is used for obtaining the desired measurement. In yet other embodiments, the heights of a two-dimensional area near the highest point is averaged or smoothed in a similar manner, to obtain the bump height. Similarly, the crease offset measurement and/or the sag measurement can also be obtained using averaged measurements of points in the region of interest.

In some embodiments, a Hough transform is performed on 3-dimensional coordinates representing the surfaces of the part, utilizing a 3-dimensional binary tree for identifying the most heavily weighted value of the tilt of one portion of the device (e.g., base 370) from a reference plane. Through a linear transformation, the tilt can be subtracted from the measured plane, rotating all measurements of the entire part to facilitate further processing by the system. In addition, the average location of the base top along a Z-axis can be normalized (subtracted from all measurements) to move the part so the average height of the base is at Z=0 (the reference plane of the coordinate system). In some embodiments, the present invention uses a Hough transform to determine a characteristic plane, such as are described in copending U.S. patent application Ser. No. 09/349,948, entitled "METHOD AND APPARATUS TO CALCULATE BGA BALL TOPS" which is incorporated by reference)), filed Jul. 8, 1999.

Figure 4:
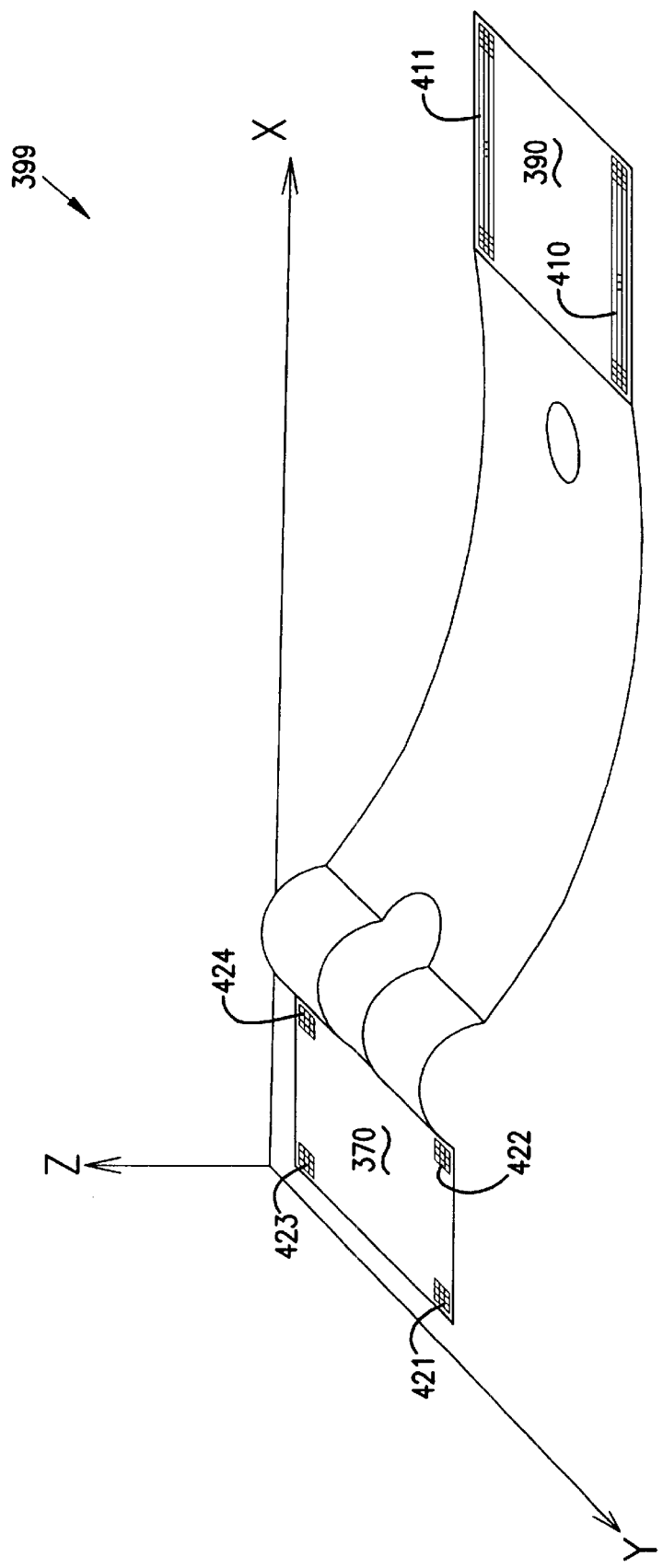
FIG. 4 shows a typical manufactured part 399 having various features to be measured.

Referring to FIG. 4, manufactured part 399 (such as shown in FIG. 1B) has various features to be measured. Part 399 here represents a disk-drive suspension, but could be any other part, assembly, or product having features to be measured. In some applications, it is important to know whether two planar portions of the part 399 are parallel, for example whether the surface of base 370 is parallel to platform 390. In some embodiments, four regions 421, 422, 423, and 424 of base 370 (each being, for example, three height pixels by three height pixels of the measured image in area) are each averaged to obtain a representative height at the four corners of base 370. That is, for each region 421, 422, 423, and 424, the nine height values are added together and the sum is divided by nine, to obtain an average height for the region centered on the center height pixel of that region. In some embodiments, the characteristic plane is determined using three such average values (e.g., three of the four regions 421, 422, 423, and 424 are chosen, or in other embodiments, regions 421, 422, and a three-by-three height pixel region located half way between region 423 and 424 are used for the three points that characterize the plane being determined), and in some such embodiments, the fourth average value is checked to determine whether it resides within the plane defined by the other three values, to within a desired accuracy. In some embodiments, this allows some check as to whether there is a saddle-like twist of the base. In other embodiments, the four average points of regions 421, 422, 423, and 424 are all used to find a best-fit plane. In some embodiments, the same type of calculation (e.g., a three-region determination, wherein each region has a plurality of height pixels, and an average point height is calculated for each region, and then these three points specify the characteristic plane) is used for both base 370 and platform 390.

In other embodiments, two lines of a planar-type region are measured, for example, a three-height-pixel by thirty-height-pixel elongated region 410 (also called a "region of interest" or ROI) along one side of platform 390 and a three-height pixel by thirty-height pixel elongated region 411 along the other side of platform 390, as shown in FIG. 4. In other embodiments (not shown) other sizes, shapes, and numbers of height pixels are used. In some embodiments, all one hundred-eighty height pixels (3×30+3×30=180) in both region 410 and region 411 are used as inputs to a best-fit algorithm to calculate a characteristic plane that best fits these points (a best-fit algorithm for a plane).

In other embodiments, two elongated regions of interest (such as region 410 and region 411) are used to find two lines that lie within the top surface of platform 390. For example, a Hough transform (or, in yet other embodiments, another best-fit algorithm) is used to determine a characteristic best-fit line through each 3×30 height pixel region. In other embodiments, each three height pixel set (of the 30 sets) is averaged to calculate an average height for the center height pixel along each region. These average center-height pixel heights are then used to fit a characteristic line for region 410 and another characteristic line for region 411. In some embodiments, if the lines are found to be parallel (within a given tolerance), they are then used to determine a characteristic plane of platform 390.

Having used one or more of the above-described methods to calculate the characteristic plane of platform 390 and the characteristic plane of platform 370 (even using different methods for each plane), the characteristic plane of platform 390 is then compared to the characteristic plane of platform 370, to determine whether they are parallel (within a given tolerance), and/or the distance between the planes, if they are parallel. In some embodiments, the two characteristic planes of base 370 and platform 390 are not transformed to align them with some standard coordinate system as described above for FIG. 1B, but are directly compared to one another.

In some embodiments, the present invention obtains a two-dimensional grid or array of heights (height pixels) for the entire scan. This can be thought of as a two-dimensional array of height pixels, wherein each height pixel value represents a height (the Z-dimension), rather than a light intensity as is obtained by, for example, a television CCD imaging device. The width of the array (the X-dimension) of height pixels is the number of pixels of each line of CCD imaging device (i.e., 2048 height pixels if a 3×2048-pixel CCD is used), and the length of the array (the Y-dimension) is as long as desired, since the scanning head can be scanned indefinitely in the Y-direction. The parts can be located anywhere in the scan, and the software can find the parts, unlike other systems (such as a laser-triangulation system) where a predetermined scan line for the laser must be defined before the part is scanned, and then only that line is measured. If the "wrong" line is chosen, the part must be scanned again using a different line. In contrast, the entire scan field is scanned by the present invention, and thus it is possible to save the entire scan grid (e.g., in a disk storage device), and then later define the regions of interest. Further, since the entire part is scanned, the data can be later rechecked for geometries or features that were not analyzed in the initial calculations.

In many embodiments, the present invention can scan one or more complete rows of parts in a single scan operation. However, in some embodiments, two or more arrays of height pixels (e.g., from successive parallel scan operations) are matched to one another along their common edge(s) and concatenated together ("stitched") to obtain data on parts that cannot be measured in a single scan due to the parts being too wide. In some such embodiments, the height pixels along, e.g., the right side of one array are matched to the height pixels along, e.g., the left side of a succeeding scan (wherein the parts are moved in the X-direction. Often, such height pixels can be matched except for a constant height difference, and such height difference is subtracted form every pixel of one of the two arrays being stitched. In other embodiments, more complex linear transformations (e.g., plane rotations) are used to align the data of one array with the data of the other array, in order that the two (or more) arrays can be concatenated/stitched together Conclusion In the context of a machine-vision system for inspecting a part, this invention includes method and apparatus to provide high-speed 3D inspection of manufactured parts. In some embodiments, precision stamped, formed, and/or lasercut metal parts are inspected to obtain dimensional and geometric information regarding such characteristics as sag or bow of subportions of the item, the angle of pitch, yaw, and or roll of one portion relative to another, heights of various formations on the part.

One aspect of the present invention provides a machine-vision system 200 for inspecting an object (for example, object 399). This system includes a light source 402, an imager 403, and a computer 128. Light source 402 provides projected patterned light on the object useful to obtain 3D geometric information about the object. The imager 403 has a reception optical axis 404 that intersects the object when the machine-vision system 200 is in operation. In some embodiments, imager 403 includes at least three rows of imaging pixels positioned to receive light shone onto the object by the light source. Computer system 128 calculates three-dimensional object-geometry data of the object using signals 409 from the imager 403, and computes at least a first characteristic plane and a second characteristic plane of the object from the calculated object-geometry data. Examples of such characteristic planes include the top plane 374 of base 370, top plane 369 of the platform 390, and planes 379, 389, 388, and 387 of section 380.

In some embodiments, the computer system 128 further computes at least one angle of the first characteristic plane relative to the second characteristic plane.

In some embodiments, the computer system 128 further computes at least a pitch angle 396 and a roll angle 397 of the first characteristic plane (e.g., plane 369) relative to the second characteristic plane (e.g., plane 374).

In some embodiments, the computer system 128 further computes at least one bump height (e.g., 386) of an area of the object relative to the first characteristic plane (e.g., plane 389).

In some embodiments, the computer system 128 further computes at least one section sag (e.g., 384) of an area of the object relative to the second characteristic plane (e.g., plane 388).

In some embodiments, the computer system 128 further computes a third characteristic plane (e.g., plane 387) of the object, and computes an intersection of the first plane (e.g., plane 389) and the second plane (e.g., plane 388), and computes an offset distance (e.g., distance 385) between the intersection and the third plane (e.g., plane 387).

In some embodiments, the machine-vision system 200 further includes an inspection station 4000 that supports the object, a scanner mechanism 408, an isolation mount 420, and a machine base 410. The scanner mechanism 408 moves the imager 403 relative to the object at the inspection station 4000 such that different portions of the object are successively imaged by the imager 403. The machine base 410 supports the inspection station 4000 and the scanner mechanism 408. The isolation mount 420 is located between the machine base 410 and the inspection station 4000 to reduce coupling of vibration between the machine base 410 and the inspection station 4000. In some embodiments, the scanner mechanism 408 and the inspection station 4000 are affixed to one another more rigidly than either is to the machine base 410. In some embodiments, the isolation mount 420 also provides vibration dampening.

In some embodiments, the machine-vision system 200 further includes a comparator 120 coupled to the computer 128. The comparator 120 compares one or more characteristics of the acquired three-dimensional object geometry data with an intended predetermined geometry to produce a signal indicative of any object geometry departure of an actual object geometry from the intended predetermined geometry.

Another aspect of the present invention provides a method of measuring a three-dimensional geometry of an object having at least one surface to be measured. The method includes receiving image signals representing a three-dimensional geometry of the object into a computer, calculating with the computer object-geometry data representing three-dimensional geometry of the object, and calculating with the computer values representing at least a first characteristic plane and a second characteristic plane of the object from the calculated object-geometry data.

In some embodiments, the method further includes calculating at least one angle of the first characteristic plane relative to the second characteristic plane.

In some embodiments, the method further includes calculating at least a pitch angle and a roll angle of the first characteristic plane relative to the second characteristic plane.

In some embodiments, the method further includes calculating at least one bump height of an area of the object relative to the first characteristic plane.

In some embodiments, the method further includes calculating at least one section sag of an area of the object relative to the second characteristic plane.

In some embodiments, the method further includes calculating a third characteristic plane of the object, and computes an intersection of the first plane and the second plane, and computes an offset distance between the intersection and the third plane.

In some embodiments, the method further includes supporting the object at an inspection station, moving an imager relative to the object at the inspection station such that different portions of the object are successively imaged by the imager, supporting the inspection station on a machine base, and mechanically isolating the inspection station from the machine base to reduce coupling of vibration between the machine base and the inspection station.

In some embodiments, the method further includes projecting patterned light onto the object, the light having a spatial-modulation pattern, scanning the object within the spatial-modulation patterned light to create a first reflected light, and receiving the first reflected light into at least three linear imager regions and generating resulting image signals.

In some embodiments, the method further includes comparing one or more characteristics of the acquired three-dimensional object geometry data with an intended predetermined geometry, and producing a signal indicative of any object geometry departure of an actual object geometry from the intended predetermined geometry.

Yet another aspect of the present invention provides a machine-vision system 200 for inspecting an object that includes a light source that provides projected light on the object and an imager, wherein the imager generates signals from the light representative of three-dimensional object-geometry data of the object. In some embodiments, system 200 includes means for determining at least a first characteristic plane and a second characteristic plane of the object from the image signals. In other embodiments, system 200 includes means for determining an angle between a first characteristic plane and a second characteristic plane of the object from the image signals. In other embodiments, system 200 includes means for determining a distance between a first feature of the object and a first characteristic plane and the distance between a second feature of the object a second characteristic plane of the object from the image signals.

Still another aspect of the present invention provides a method for measuring relative measurements of a part in a three-dimensional representation of part measurements. This method includes obtaining three-dimensional data points representing a geometry of the part, successively examining a plurality of data points along each of a plurality of radial directions in the three-dimensional data points in order to locate at least one distinctive part feature along each of the plurality of radial directions, fitting a predetermined geometric model to the distinctive part features to obtain a representation of the part, and performing a linear transformation based on the geometric model to align the representation of the part to a standard orientation. In some embodiments, this method also includes calculating at least one angle a portion of the part relative to the standard orientation. In some embodiments, this method also includes calculating at least a pitch angle and a roll angle of a portion of the part relative to the standard orientation. In some embodiments, this method includes calculating a height of a portion of the part relative to the standard orientation. In some embodiments, the geometric model is a plane, and the linear transformation rotates the representation of the part to align the plane to the standard orientation.

The present invention also provides a machine-vision system for inspecting a device. The system 200 includes an inspection station 4000. The inspection station includes a light source 402 that provides projected patterned illumination on the device that is useful to obtain 3D geometric information about the device; and an imager 403, wherein the imager 403 has a reception optical axis 404, the reception optical axis 404 intersecting the device 399 when the machine-vision head is in operation, wherein the imager 403 includes at least three substantially parallel rows of semiconductor imaging pixels positioned to receive illumination shone onto the device by the light source 402. The system also includes a scanner mechanism 408 that moves the imager relative to the device such that different portions of the device are successively imaged by the imager 403. In some embodiments, for each point of the device that is measured, three images are obtained, one as the point is positioned to be imaged to the first row of semiconductor imaging pixels, a second as the point is positioned to be imaged to the second row of semiconductor imaging pixels, and a third as the point is positioned to be imaged to the third row of semiconductor imaging pixels. These three images then allow calculation of the height of the point using, for example, the process described in U.S. Pat. No. 5,636,025. Measurements of several points are then fit to a geometric shape (for example, a plane) to each of a first and a second area of the object using a method described in U.S. patent application Ser. No. 09/349,948, entitled METHOD AND APPARATUS TO CALCULATE BGA BALL TOPS. These planes are then used in one or more calculations to determine an angle between the planes (e.g., a pitch angle and/or a roll angle), and/or various distances between these planes and other features of the object. A comparator coupled to the system is used to compare one or more characteristics of the acquired three-dimensional device geometry data with an intended predetermined geometry to produce a signal indicative of any device geometry departure of an actual device geometry from the intended predetermined geometry.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A machine-vision system for inspecting an object, comprising:
   a light source that provides projected patterned light on the object useful to obtain 3D geometric information about the object;
   an imager, wherein the imager has a reception optical axis that intersects the object when the machine-vision system is in operation, and wherein the imager includes at least three rows of imaging pixels positioned to receive light shone onto the object by the light source; and a computer system that calculates three-dimensional object-geometry data of the object using signals from the imager, and computes at least a first characteristic plane and a second characteristic plane of the object from the calculated object-geometry data.

2. The machine-vision system of claim 1, wherein the computer system further computes at least one angle of the first characteristic plane relative to the second characteristic plane.

3. The machine-vision system of claim 1, wherein the computer system further computes at least a pitch angle and a roll angle of the first characteristic plane relative to the second characteristic plane.

4. The machine-vision system of claim 1, wherein the computer system further computes at least one bump height of an area of the object relative to the first characteristic plane.

5. The machine-vision system of claim 1, wherein the computer system further computes at least one section sag of an area of the object relative to the second characteristic plane.

6. The machine-vision system of claim 1, wherein the computer system further computes a third characteristic plane of the object, and computes an intersection of the first plane and the second plane, and computes an offset distance between the intersection and the third plane.

7. The machine-vision system of claim 1, further comprising:

an inspection station that supports the object;

a scanner mechanism that moves the imager relative to the object at the inspection station such that different portions of the object are successively imaged by the imager;

a machine base that supports the inspection station and the scanner mechanism; and an isolation mount between the machine base and the inspection station to reduce transmission of vibration between the machine base and the inspection station.

8. The machine-vision system of claim 7, wherein the scanner mechanism and the inspection station are affixed to one another more rigidly than either is to the machine base.

9. The machine-vision system of claim 7, further comprising:

a comparator coupled to the computer, wherein the comparator compares one or more characteristics of the acquired three-dimensional object geometry data with an intended predetermined geometry to produce a signal indicative of any object geometry departure of an actual object geometry from the intended predetermined geometry.

10. The machine-vision system of claim 1, further comprising:

a comparator coupled to the computer, wherein the comparator compares one or more characteristics of the acquired three-dimensional object geometry data with an intended predetermined geometry to produce a signal indicative of any object geometry departure of an actual object geometry from the intended predetermined geometry.

11. A method of measuring a three-dimensional geometry of an object having at least one surface to be measured, comprising:

(a) receiving image signals representing a three-dimensional geometry of the object into a computer;

(b) calculating with the computer object-geometry data representing three-dimensional geometry of the object; and (c) calculating with the computer values representing at least a first characteristic plane and a second characteristic plane of the object from the calculated object-geometry data.

12. The method of claim 11, further comprising:

(d) calculating at least one angle of the first characteristic plane relative to the second characteristic plane.

13. The method of claim 11, further comprising:

(e) calculating at least a pitch angle and a roll angle of the first characteristic plane relative to the second characteristic plane.

14. The method of claim 11, further comprising:

(f) calculating at least one bump height of an area of the object relative to the first characteristic plane.

15. The method of claim 11, further comprising:

(g) calculating at least one section sag of an area of the object relative to the second characteristic plane.

16. The method of claim 11, further comprising:

(h) calculating a third characteristic plane of the object, and computes an intersection of the first plane and the second plane, and computes an offset distance between the intersection and the third plane.

17. The method of claim 11, further comprising:

(i) supporting the object at an inspection station;

(j) moving an imager relative to the object at the inspection station such that different portions of the object are successively imaged by the imager;

(k) supporting the inspection station on a machine base; and (l) mechanically isolating the inspection station from the machine base to reduce coupling of vibration between the machine base and the inspection station.

18. The method of claim 11, further comprising:

(m) projecting patterned light onto the object, the light having a spatial-modulation pattern;

(n) scanning the object within the spatial-modulation patterned light to create a first reflected light; and (o) receiving the first reflected light into at least three linear imager regions and generating resulting image signals.

19. The method of claim 11, further comprising:

(p) comparing one or more characteristics of the acquired three-dimensional object geometry data with an intended predetermined geometry; and (q) producing a signal indicative of any object geometry departure of an actual object geometry from the intended predetermined geometry.

20. A machine-vision system for inspecting an object, comprising:

a light source that provides projected light on the object;

an imager, wherein the imager generates signals from the light representative of three-dimensional object-geometry data of the object;

means for determining at least a first characteristic plane and a second characteristic plane of the object from the image signals.

21. A machine-vision system for inspecting an object, comprising:

a light source that provides projected light on the object;

an imager, wherein the imager generates signals from the light representative of three-dimensional object-geometry data of the object;

means for determining an angle between a first characteristic plane and a second characteristic plane of the object from the image signals.

22. A machine-vision system for inspecting an object, comprising:

a light source that provides projected light on the object;

an imager, wherein the imager generates signals from the light representative of three-dimensional object-geometry data of the object;

means for determining a distance between a first feature of the object and a first characteristic plane and the distance between a second feature of the object a second characteristic plane of the object from the image signals.

23. A method for measuring relative measurements of a part in a three-dimensional representation of part measurements comprising:

obtaining three-dimensional data points representing a geometry of the part;

successively examining a plurality of data points along each of a plurality of radial directions in the three-dimensional data points in order to locate at least one distinctive part feature along each of the plurality of radial directions;

fitting a predetermined geometric model to the distinctive part features to obtain a representation of the part; and performing a linear transformation based on the geometric model to align representation of the part to a standard orientation.

24. The method of claim 23, further comprising:

calculating at least one angle a portion of the part relative to the standard orientation.

25. The method of claim 23, further comprising:

calculating at least a pitch angle and a roll angle of a portion of the part relative to the standard orientation.

26. The method of claim 23, further comprising:

calculating a height of a portion of the part relative to the standard orientation.

27. The method of claim 23, wherein the geometric model is a plane, and the linear transformation rotates the representation of the part to align the plane to the standard orientation.

* * * * *